United States Patent

[11] 3,588,331

[72] Inventor Charles H. Vermillion
Greenbelt, Md.
[21] Appl. No. 733,039
[22] Filed May 29, 1968
[45] Patented June 28, 1971
[73] Assignee The United States of America as represented by the Administration of the National Aeronautics and Space Administration

[54] FACSIMILE VIDEO REMODULATION NETWORK
9 Claims, 1 Drawing Fig.

[52] U.S. Cl. .......... 178/6, 178/DIG 12, 178/7.3, 325/13, 325/10
[51] Int. Cl. .......... H04n 5/14, H04b 7/14
[50] Field of Search .......... 178/6 (NS), 7.1 (AC), 7.3 (E), 7.5 (E), 70, (Inquired); 325/10, 13; 179/15 (APR); 328/164

[56] References Cited
UNITED STATES PATENTS

| | | | |
|---|---|---|---|
| 3,047,656 | 7/1962 | Suhrmann | 178/7.5E |
| 2,659,813 | 11/1953 | Schelleng | 325/10 |
| 2,692,333 | 10/1954 | Holmes | 178/6GAMMA |
| 2,957,042 | 10/1960 | Gibson | 178/7.1AC |
| 2,998,516 | 8/1961 | Lehan | 325/10 |
| 3,118,111 | 1/1964 | Miller | 325/13 |

Primary Examiner—Robert L. Griffin
Assistant Examiner—Joseph A. Orsino, Jr.
Attorneys—R. F. Kempf, E. Levy and G. T. McCoy

ABSTRACT: This disclosure describes an apparatus for restoring and improving facsimile video signals that have been degraded prior to reception. The incoming video signal is demodulated and applied to a linear differential amplifier circuit and to a control circuit connected in parallel with the linear differential amplifier circuit. The control circuit controls the restoring of the demodulated signal by linearly controlling the black level of the video signal or by nonlinearly controlling the difference between the black and white levels of the video signal passing through the linear differential amplifier. The invention also includes means for detecting the frequency of video carrier signal and using the detected signal to control a switching network. The switching network switches its output at the frequency of and coherently with the incoming signal. The output of the switching circuit modulates the restored video signal in a modulator. Hence, the output from modulator is a restored video signal having a carrier frequency that is the same as the carrier frequency of the unrestored (incoming) video signal.

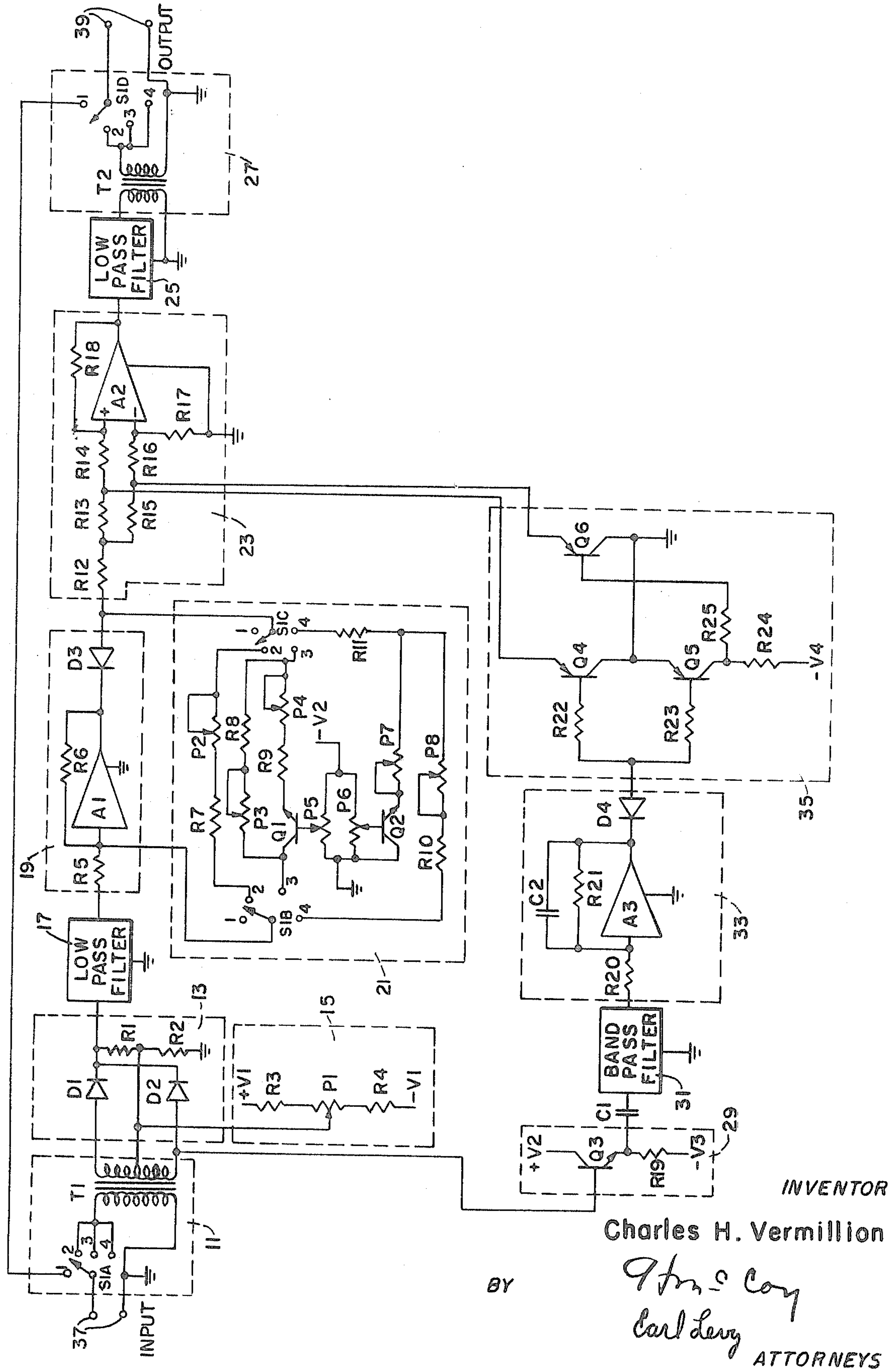
INVENTOR
Charles H. Vermillion
BY
ATTORNEYS

FACSIMILE VIDEO REMODULATION NETWORK

SOURCE OF INVENTION

The invention described herein was made by an employee of the U.S. Government and may be manufactured and used by or for the government for governmental purposes without the payment of any royalties thereon or therefor.

BACKGROUND OF THE INVENTION

The use of television systems for transmitting pictures from remote environments has become widespread. Examples of such uses are in NASA's Weather Satellite Systems. The TIROS and Nimbus Satellite Systems, by an Automatic Picture Taking (APT) network, take pictures of the earth's weather map as viewed from space. The pictures are transmitted to earth receiving stations via video channels.

While the TIROS and Nimbus APT network has been very satisfactory, it has been found that the video signals received at the earth stations degrade after a satellite APT network has been in use for a period of time. That is, it has been found that a "dark current shift" occurs after a satellite has been operational for a period of time. In effect, the "dark current shift" degrades the pictures in such a manner that the black level of the pictures moves upwards toward the white level of the picture. Because the dynamic picture range of the pictures is decreased, the pictures become unsuitable for meteorological evaluation.

Therefore, it is an object of this invention to provide an apparatus for restoring and improving facsimile video signals that have been degraded.

It is also an object of this invention to provide an apparatus for compensating for the "dark current shift" that occurs when a television system has been in use for a period of time.

It is another object of this invention to provide an apparatus for restoring and improving facsimile video signals that have been degraded by a "dark current shift" that occurs in a remotely operated television system after the system has been in operation a period of time.

It will be appreciated that in some systems, such as the TIROS APT network, the means for compensating for picture degradation must be inexpensive. That is, because the TIROS system is designed for widespread use, low cost receiving systems have been developed. Hence, it is desirable to provide a system for restoring and improving facsimile video signals that is uncomplicated and, therefore, inexpensive.

Consequently, it is yet another object of this invention to provide an uncomplicated and inexpensive apparatus for restoring and improving facsimile video signals that have been degraded.

SUMMARY OF THE INVENTION

In accordance with a principle of this invention an apparatus for restoring and improving facsimile video signals that have been degraded is provided. The apparatus includes a demodulator for demodulating the incoming degraded video signal. The output from the demodulator is connected to a linear differential amplifying circuit and to a control circuit. The control circuit can be set to compensate for various predetermined conditions that effect a video signal, such as high black level, for example.

The control circuit controls the restoring and improving of the demodulated degraded video signal by controlling the passage of the signal through the linear differential amplifying circuit. In addition, the frequency of the carrier signal of the incoming degraded video signal is detected in a frequency detecting network and used to control a switching circuit. The switching circuit generates an output signal at the frequency of and coherent with the incoming carrier signal. The output from the switching network modulates the restored and improved video signal in a modulator. Hence, the output from the modulator is an improved and restored (contrast added) video signal having the same carrier frequency as the degraded incoming video signal.

It will be appreciated from the foregoing description that the invention is a rather uncomplicated system for restoring and improving a degraded video signal. The incoming signal is merely demodulated and its frequency is detected. The demodulated signal is restored and improved. Thereafter, the demodulated signal is remodulated at the frequency of the carrier signal. The output signal therefore is an improved and restored video signal having a carrier signal frequency the same as the frequency of the incoming carrier signal. Hence, the restored signal is suitable for application to a conventional receiver network without further electronic manipulation.

BRIEF DESCRIPTION OF THE DRAWINGS

The foregoing objects and many of the attendant advantages of this invention will become more readily appreciated as the same becomes better understood from the following detailed description of the invention when taken in conjunction with the accompanying FIGURE. The FIGURE is partially in block form and partially in schematic form and illustrate a preferred embodiment of the invention.

DESCRIPTION OF THE PREFERRED EMBODIMENT

Turning now to the drawing, the video restoring and improving (enhancing) network of the invention comprises: an input circuit 11; a demodulator 13; a demodulator bias control circuit 15; a first low pass filter 17; an amplifier and inverter circuit 19; a control circuit 21; a modulator 23; a second low pass filter 25; an output circuit 27; an isolating circuit 29; a band pass filter 31; an amplifier circuit 33; and, a switching circuit 35.

The input circuit comprises a first four position switch designated S1A and a transformer designated T1. The switch has a common terminal and four position terminals designated 1, 2, 3, and 4. The incoming signal is applied to a pair of input terminals 37. One input terminal is grounded and connected to one side of the primary winding of T1. The other input terminal is connected to the common terminal S1A. Position terminals 2, 3 and 4 of S1A are connected together and to the other side of the primary winding of T1.

The demodulator 13 comprises first and second diodes designated D1 and D2 and first and second resistors designated R1 and R2. The anode of D1 is connected to one side of the secondary winding T1 and the anode of D2 is connected to the other side of the secondary winding. R1 and R2 are connected in series between the cathodes of D1 and D2 and ground. The junction between R1 and R2 is connected to a center tap of the secondary winding of T1.

The demodulator bias control circuit 15 comprises third and fourth resistors designated R3 and R4 and a first potentiometer designated P1. R3, P1 and R4 are connected in series in that order between a positive voltage source designated +V1 and a negative voltage source designated −V1. The tap of potentiometer P1 is connected to the center tap of the secondary winding of T1.

The cathodes of D1 and D2 are connected to the input of the first low pass filter 17. The first low pass filter 17 has a common ground for its input and output terminals. The output of the first low pass filter 17 is connected to the input of the amplifier and inverter circuit 19.

The amplifier and inverter circuit comprises: a first linear differential amplifier designated A1; fifth and sixth resistors designated R5 and R6; and a third diode designated D3. The output from the first low pass filter 17 is connected through R5 to the input of A1. R6 is a feedback resistor and is connected between the input and the output of A1. A1 is grounded in a conventional manner. The output of A1 is connected to the cathode of D3.

The control circuit 21 comprises: seventh, eighth, ninth, tenth and eleventh resistors designated R7, R8, R9, R10 and R11; second, third, fourth, fifth, sixth, seventh and eighth potentiometers designated P2, P3, P4, P5, P6, P7 and P8; first and second transistors designated Q1 and Q2; and, second and third four position switches designated S1B and S1C. The terminals of each of the positions of S1B and S1C are designated 1, 2, 3, and 4 with the 1 position terminal being unconnected.

The common terminal of S1B is connected to the junction between R5 and the input A1. The 2 position terminal of S1B is connected through R7 in series with P2 in that order to the 2 position terminal of S1C. The tap of P2 is connected to the junction between P2 and the 2 position terminal of S1C. The 3 position terminal of S1B is connected through P3 in series with R8 in that order to the 3 position terminal of S1B. The tap of P3 is connected to the junction between P3 and R8. The 3 position terminal of S1B is also connected to the collector of Q1. The emitter of Q1 is connected through R9 in series with P4 in that order to the 3 position terminal of S1C. The tap of P4 is connected to the 3 position terminal of S1C.

P5 and P6 are connected in parallel between a second negative voltage source designated −V2 and ground. The tap of P5 is connected to the base of Q1 and the tap of P6 is connected the base of Q2. The collector of Q2 is connected to ground. The emitter of Q2 is connected through P7 in series with R11 in that order to the 4 position terminal of S1C. The tap of P7 is connected to the emitter of Q2. The 4 position terminal of S1B is connected through R10 in series with P8 in that order to the junction between P7 and R11. The tap of P8 is connected to the junction between R10 and P8. The common terminal of S1C is connected to the anode of D3.

The modulator 23 comprises twelfth, thirteenth, fourteenth, fifteenth, sixteenth, seventeenth and eighteenth resistors designated R12, R13, R14, R15, R16, R17 and R18, and a second linear differential amplifier designated A2. The second linear differential amplifier A2 has inverting and noninverting inputs. The anode of D3 is connected through R12, R13 and R14 connected in series in that order to the inverting (+) input of A2. The junction between R12 and R13 is connected through R15 connected in series with R16 to the noninverting (−) input of A2. The noninverting input of A2 is also connected through R17 to ground. R18 is a feedback resistor and is connected between the inverting input and the output of A2. A2 is also connected to ground in a conventional manner.

The output of A2 is connected to the input of the second low pass filter 25. The second low pass filter 25 has a common ground for its input and output terminals.

The output circuit 27 comprises a second transformer designated T2 and a fourth position switch designated S1D. The four positions of S1D have terminals that are designated 1, 2, 3 and 4. THe output of the second low pass filter 25 is connected to one side of the primary winding of T2. The other side of the primary winding of T2 is connected to ground. The secondary winding of T2 has one side connected to the 2, 3 and 4 position terminals of S1D. The first position terminal of S1D is connected to the first position terminal of S1A. The common terminal of S1D is connected to one output terminal 39 of a pair of output terminals, and the other side of the secondary winding of T2 is connected to the second output terminal 39 of the pair and to ground.

The isolating circuit 29 is an emitter follower circuit and comprises a third transistor designated Q3 and a nineteenth resistor designated R19. The base of Q3 is connected to the anode of D2. The collector Q3 is connected to a second positive voltage source designated +V2. The emitter of Q3 is connected through R19 to a third negative voltage source designated −V3. The emitter of Q3 is connected through a first capacitor designated C1 to the input of the band pass filter 31. The band pass filter has a common ground for its input and output terminals.

The amplifier circuit 33 comprises: a third linear differential amplifier designated A3; twentieth and twenty-first resistors designated R20 and R21; a second capacitor designated C2; and, a fourth diode designated D4. The output of the band pass filter 31 is connected through R20 to the input of A3. R1 and C2 are connected in parallel between the input and the output of A3. A3 is grounded in a conventional manner. The output of A3 is connected to the cathode of D4.

The switching circuit 35 comprises fourth, fifth and sixth transistors designated Q4, Q5 and Q6 and twenty-second, twenty-third, twenty-fourth and twenty-fifth resistors designated R22, R23, R24 and R25. The anode of D4 is connected through R22 to the base of Q4 and through R23 to the base of Q5. The collector of Q4 is connected to the emitter of Q5. The emitter of Q4 is connected to the junction between R13 and R14. The collector of Q5 is connected through R24 to a fourth negative voltage source designated −V4. The collector of Q5 is also connected through R25 to the base of Q6. The junction between the collector of Q4 and the emitter of Q5 is connected to the collector of Q6 and to ground. The emitter of Q6 is connected to the junction between R15 and R16.

Preferably, all of the linear differential amplifiers A1, A2, and A3 are integrated circuit-type operational amplifiers. Also, preferably, the first low pass filter 17 only passes signals in the video signal range, but not in the carrier signal range while the second low pass filter 25 passes signals in both the carrier range and the video signal range. In addition, preferably, the band pass filter 31 only passes signals in the carrier frequency range. For example, if the carrier frequency signal is 2.4 kHz., the band pass filter 31 passes a signal of this frequency. The first low pass filter 17 may pass a signal of 1.5 kHz. and the second low pass filter 25 may pass a signal of 5 kHz.

Also, preferably, the four four position switches S1A, S1B, S1C and S1D are operated by a common switch control. Hence, when the switches are in position 1 the input is connected directly to the output and the apparatus of the invention is bypassed. However, when the switches are in positions 2, 3 or 4 the apparatus of the invention is operative in the manner hereinafter described.

The upper portion of the apparatus illustrated in the FIGURE comprises the video restoring and improving portion of the invention while the lower portion of the apparatus illustrated in the FIGURE comprises the carrier signal regeneration portion of the invention. More specifically, the demodulator, the demodulator 13 bias control circuit 15, the first and second low pass filters 17 and 25, the amplifier and inverter circuit 19, the control circuit 21, and the modulator 23, demodulate, restore and improve, and remodulate the video portion of the incoming signal. The isolating circuit 29, the band pass filter 31, the amplifier circuit 33 and the switching circuit 35 detect the frequency of the carrier of the incoming degraded video signal and regenerate a carrier signal at the frequency of the incoming carrier signal.

Turning now to the operation of the invention, when the four four position switches S1A, S1B, S1C and S1D are in position 1 the overall apparatus of the invention is bypassed because the input terminals 37 are directly connected to the output terminal 39. However, when the four switches are in the 2, 3 or 4 positions, the apparatus of the invention becomes operative.

Regardless of whether the switches are in positions 2, 3 or 4, the lower half of the apparatus illustrated in the FIGURE operates the same, hence, that portion of the apparatus will be discussed first. When the switches are in positions 2, 3 or 4, the isolating or emitter-follower circuit 29 senses the frequency of the incoming signal and prevents transformer imbalance. The band pass filter senses and passes signals at the carrier frequency. Hence, the signal applied to the amplifier circuit 33 is at the carrier frequency. The third linear differential amplifier A3 and its feedback elements form an amplifier that is operating near its open loop gain (almost infinite). Hence, the output from the amplifier circuit 33 is a trigger signal having a frequency equal to and coherent with the frequency of the incoming carrier signal. This signal is applied to the switching circuit 35 and alternately switches the fourth and fifth transistors Q4 and Q5 between saturated and nonsaturated states. The switching of Q4 applies a regenerated carrier signal to the inverting input of A2 while the switching of Q5 applies a switching signal to Q6. Q6 inverts and applies a further regenerated carrier signal to the noninverting input of A2. Hence, the switching or regenerated carrier signal applied by the switching circuit 35 to the modulator 23 is at the frequency of and coherent with the incoming carrier signal. D4 merely cancels the DC component of the signal from A3.

Turning now to the operation of the video restoring and improving portion of the invention, the demodulator bias control circuit 15 merely biases the demodulator 13 to provide the necessary black level or "set" control. P1 can be adjusted to provide either zero bias or a positive or negative bias setting. Hence, this control merely raises or lowers the ambient level of demodulation of the demodulator 13.

When the switches are in position 2, only R7 and P2 of the control circuit 21 are operative. The remaining portion of the control circuit is not connected. In position 2, the positive portion of the incoming video signal passing through T1 and is demodulated by D1 and D2 in a conventional manner. The demodulated positive portion of the video signal is an envelope that passes through the low pass filter 17 and is applied to the amplifier and inverter circuit 19.

Position 2 is a black level control position. That is, the black level of the video signal can be linearly varied to vary the overall contrast of the facsimile picture. More specifically, when the switches are in position 2 a second feedback loop consisting of R7 and P2 is applied to the amplifier and inverter circuit 19. Because both of the components of this feedback loop are linear, the variation in black level is linear. The gain of this feedback loop is determined by the setting of the tap of P2. After the video signal's black level is adjusted by the amplifier and inverter circuit 19, the restored video signal is applied to the modulator 23. The modulator remodulates the video signal at the frequency of the output from the switching circuit 35, said signal frequency of the output from the switching circuit being the same as and coherent with the frequency of the incoming carrier signal. This signal passes through the low pass filter 25 and the output circuit 27 to the output terminals 39.

Switch positions 3 and 4 are black enhancement control and white enhancement control positions, respectively. When the switches are in these positions, a nonlinear feedback path is provided for the amplifier and inverter circuit 19. These nonlinear feedback paths vary the white and black levels of the incoming video signal. When all of the switches are in position 3, the incoming signal is demodulated in the manner herein above described with respect to position 2. When the switches are in this position (3) transistor Q1 is connected into the feedback loop to provide a nonlinear feedback path. Specifically, when the output of the amplifier and inverter circuit 19 is sufficiently negative to forward bias the base-emitter junction of Q1 resistor R9 and potentiometer P4 are connected in the feedback path. This connection reduces the gain of A1 in a nonlinear manner. The adjustment of P5 determines the "-break" point of the base-emitter junction of Q1. Potentiometer P3 and resistor R8 determine the gain of Q1 before the "-break" point is reached, with P3 permitting the adjustment thereof. After the "break" point is reached P4 determines the gain of feedback path. It will be appreciated that reducing the gain of A1 enhances the black level of the video signal while having little or no effect on the white level.

The operation of the control circuit in position 4 is somewhat similar to the operation of the control circuit in position 3. Position 4 is the white enhancement control mode position. In this position, Q2 is adapted to shunt the impedance divider comprised of R10, P8 and R11 to ground. Specifically, a portion of the feedback current is grounded when Q2 is energized. Q2 becomes energized when the output from the amplifier and inverter circuit 19 becomes sufficiently negative to forward bias the base-emitter junction of Q2. When Q2 is energized, the feedback voltage is reduced thereby increasing the gain of the amplifier and inverter circuit 19. Increased gain results in white level enhancement with little or no black level enhancement. In this manner, detailed cloud outlines may be made.

It will be appreciated from the foregoing discussion of the operation of the invention that the control circuit 21 merely provides a linear or nonlinear feedback path. When the linear feedback path (position 2) is operative, the black level of the incoming video signal is varied to restore the signal. When the switches are in position 3, the black level of the signal is enhanced and, when the switches are in position 4, the white level of the signal is enhanced. In this manner, the incoming video signal is restored and improved.

As with position 2, after position 3 or 4's enhancement, the video signal is modulated at the rate of the incoming carrier signal. Hence, the output is an enhanced and remodulated video signal. Since this signal is at the same frequency as and coherent with the incoming signal, the output signal can be directly connected to a receiver without further electronic manipulation.

It will be appreciated from the foregoing description of the invention that a rather uncomplicated and, therefore, inexpensive method of remodulating a video signal is provided. The remodulated signal is improved and restored. If desired, the black level or contrast of the signal can be varied to restore and improve the signal. Alternatively, either the white level or the black level can be enhanced without enhancing the other level.

While the foregoing has described a preferred embodiment of the invention, it will be appreciated by those skilled in the art and others that various modifications can be made in light thereof. Specifically, alternative nonlinear control systems can be provided. In addition, modulators and demodulators other than those specifically illustrated in the FIG. and described herein can be utilized with the invention. Hence, the invention can be practiced otherwise than is specifically described herein.

It will also be appreciated that while the invention is useful in enhancing video signals from remote transmitters, such as those on board a Tiros Satellite, it also is useful in other environments. For example, the invention is useful in restoring and enhancing general commercial telephoto transmitting systems. In fact, the invention is useful in restoring and enhancing the pictures transmitted by most electronic facsimile systems.

I claim:

1. An apparatus for restoring and enhancing a degraded video signal comprising:

demodulator means for receiving an incoming signal and demodulating said degraded video signal therefrom;

biasing means connected to said demodulator means for referencing the black level of said degraded video signal;

amplifier means connected to the output of said demodulator means for amplifying and adjusting the ratio of the white level to black level of the video output signal from said demodulator means to thereby restore and enhance the video signal at the output therefrom;

carrier regenerating means for detecting the carrier frequency of said incoming signal and for regenerating an output signal at the carrier frequency of the incoming signal; and modulator means having one input connected to the output of said amplifier means and a second input connected to the output of said carrier regenerating means for modulating said restored and enhanced video signal at the carrier frequency of said incoming signal, said amplifier means including a control means having a plurality of paths, each of said paths being selectively connectable as a feedback network for said amplifier means.

2. Apparatus as claimed in claim 1 wherein one of said paths of said control means provides a linear feedback signal path to enable overall contrast control of the video signal from said amplifier means and wherein at least another one of said paths of said control means provides a nonlinear feedback signal path to vary the black and white levels of the video signal from said amplifier means.

3. Apparatus as claimed in claim 2 wherein said amplifier means comprises:

a linear differential operational amplifier;

a first resistor connected between the input and the output of said linear differential operational amplifier;

a second resistor having one end connected to the input of said linear differential operational amplifier; and a diode having its cathode connected to the output of said linear differential operational amplifier.

4. Apparatus as claimed in claim 3 wherein said linear feedback signal path of said control means comprises a resistor connected in series with a potentiometer, said linear feedback path connectable between the input of said linear differential amplifier and the anode of said diode of said amplifier means.

5. Apparatus as claimed in claim 4 wherein said control means includes a first nonlinear feedback path comprising:

a transistor;

a first resistor;

a first potentiometer;

the collector-emitter junction of said transistor and the first resistor and first potentiometer connected in series and connectable between the input of said linear differential amplifier and the anode of said diode of said amplifier means;

a second resistor;

a second potentiometer;

said second resistor and said second potentiometer connected in parallel with the collector-emitter junction of said transistor and said first resistor and first potentiometer; and a third potentiometer connected between a voltage source and ground and having its tap connected to the base of said transistor.

6. Apparatus as claimed in claim 5 wherein said control means includes a second nonlinear feedback path comprising:

a first resistor;

a second resistor;

a first potentiometer;

said first resistor, said first potentiometer and said second resistor connectable in that order between the input of said linear differential amplifier and the anode of said diode of said amplifier means;

a transistor;

a second potentiometer;

the emitter-collector junction of said transistor connected in series with said second potentiometer between the junction between said second resistor and said first potentiometer and ground;

a third potentiometer connected between a voltage source and ground and having its top connected to the base of said transistor.

7. Apparatus as claimed in claim 6 wherein said control means includes a switching means for selectively switching said linear, said first nonlinear and said second nonlinear feedback paths between the input of said linear differential amplifier and the anode of said diode of said amplifier means.

8. Apparatus as claimed in claim 7 wherein said carrier regenerating means comprises:

as isolating circuit connected to said demodulator means;

a band pass filter connected to said isolating circuit;

an amplifying circuit connected to the output of said band pass filter; and a switching means connected to the output of said amplifying circuit and to an input of said modulator means.

9. Apparatus as claimed in claim 8 including:

a first low pass filter connected between said demodulator and the other end of said second resistor of said amplifier means; and a second low pass filter having its input connected to the output of said modulator means.